United States Patent [19]
Garnett

[11] Patent Number: 5,042,826
[45] Date of Patent: Aug. 27, 1991

[54] COLLET

[75] Inventor: Donald W. Garnett, Grand Ledge, Mich.

[73] Assignee: The Olofsson Corporation, Lansing, Mich.

[21] Appl. No.: 572,570

[22] Filed: Aug. 24, 1990

[51] Int. Cl.⁵ .............................................. B23B 31/08
[52] U.S. Cl. .................. 279/1 SG; 279/1 D; 279/83
[58] Field of Search ............... 279/1 D, 1 DC, 1 P, 279/1 SG, 46 A, 1 A, 83; 408/239, 239 A, 240

[56] References Cited
U.S. PATENT DOCUMENTS 3,873,107  3/1975  Hohwart et al. ................... 279/1 D
4,133,544  1/1979  Halvorsen .......................... 279/1 D
4,796,900  1/1989  Gant et al. ..................... 279/1 A X FOREIGN PATENT DOCUMENTS
925064  8/1947  France ............................. 279/1 D Primary Examiner—Z. R. Bilinsky
Attorney, Agent, or Firm—Barnes, Kisselle, Raisch, Choate, Whittemore & Hulbert

[57]  ABSTRACT

A machine collet is provided for mounting and centering tools with minimum circular runout. The collet has a single pieces body formed with integral resilient flexures having lands for gripping the tool shank. The flexures are machined to the same dimensions and yield equally, thus maintaining centrality regardless of tool shank diameter.

7 Claims, 1 Drawing Sheet

COLLET

This invention relates generally to collets, and refers more particularly to collets for mounting and centering tools such as mills, drills, reamers, grinding arbors and the like with minimum circular runout.

BACKGROUND OF THE INVENTION

The mounting of tools concentric with the axis of rotation is necessary for good machining practice. If the tool is mounted in a machine collet eccentric to its center, several undesirable effects result. Cutting flutes at the high point of eccentricity will cut oversize. These same flutes will take a heavier cut than flutes at the low point of eccentricity and fail earlier. These same flutes will cut deeper than the other flutes, resulting in a rough micro-finish.

The mounting shanks of tools vary in diameter, but the tools must be centered in the collet regardless of tool shank diameter. However, it has been found that collets which clamp these tool shanks against sliding surfaces lack repeatability. This is because of variations in friction and also because of a slip-stick motion, both of which are characteristic of sliding surfaces.

Collets which are clamped by manual tightening or by the application of hydraulic or pneumatic pressure vary the circular runout since these methods are not exactly repeatable. For example, an operator may not tighten with the same pressure each time. As a result, the compliant members of the machine collet do not react the same and centering does not repeat.

SUMMARY OF THE INVENTION

This invention provides a machine collet for mounting and centering tools with minimum circular runout by means of a very repeatable clamping action of relatively stiff flexible, resilient flexural elements or flexures which do not involve frictional or sliding clamping forces. The clamping action is self-energizing. The operator is involved only with the tool release.

Preferably, the clamping of the tool shanks is provided by land-forming V blocks at the front and at the rear of the collet. These land-forming V blocks are machined integrally with the supporting flexures. The flexures are preferably machined to the same dimensions and, therefore, yield equally, thus maintaining centrality regardless of tool shank diameter.

The flexures provide sufficient stiffness to resist displacement of the tool by cutting forces.

Objects, features and advantages of this invention are to provide a collet having the above features, and one which is easy to operate, of a rugged and simple design and economical to manufacture.

These and other objects of the invention will become more apparent as the following description proceeds, especially when considered with the accompanying drawings.

DETAILED DESCRIPTION

Figure 1:
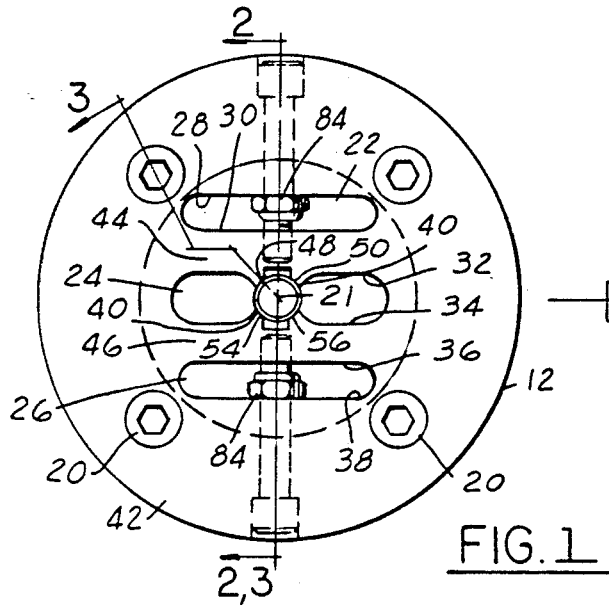
FIG. 1 is a front view of a collet constructed in accordance with the invention.
Figure 2:
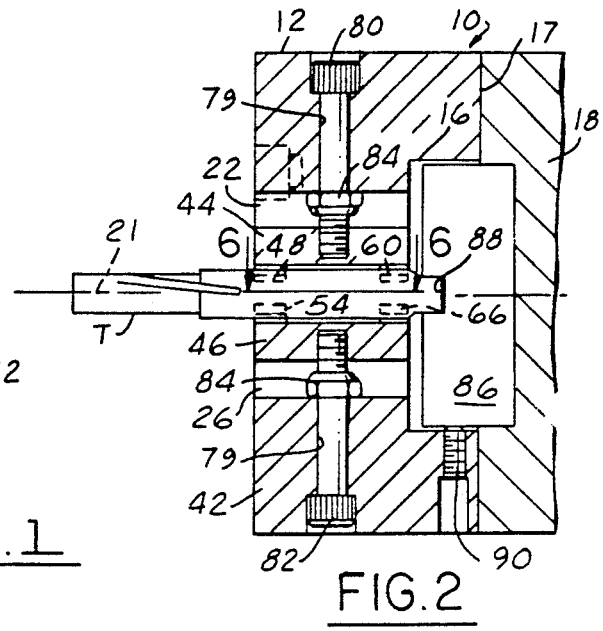
FIG. 2 is a sectional view taken on the line 2—2 in FIG. 1.
Figure 3:
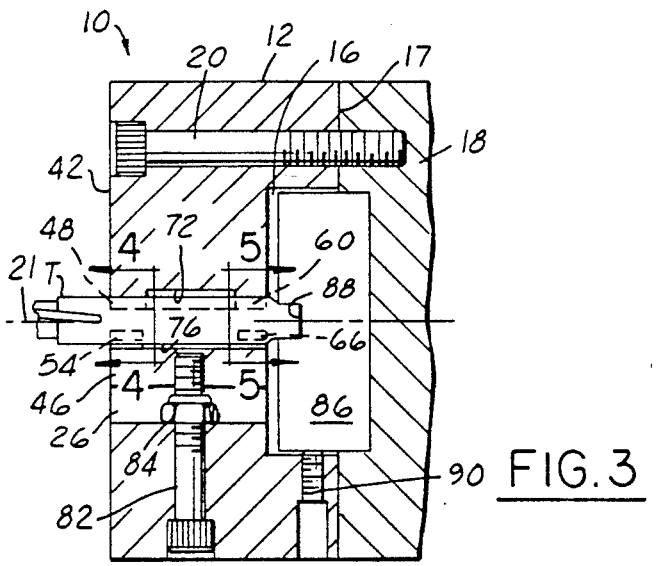
FIG. 3 is a sectional view taken on the line 3—3 in FIG. 1.
Figure 4:
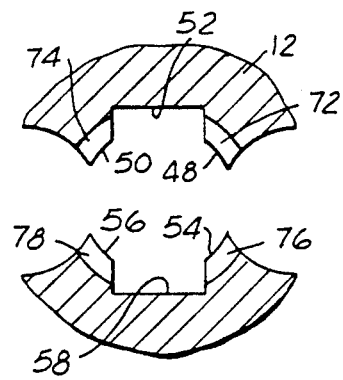
FIG. 4 is a fragmentary sectional view taken on the line 4—4 in FIG. 3.
Figure 6:
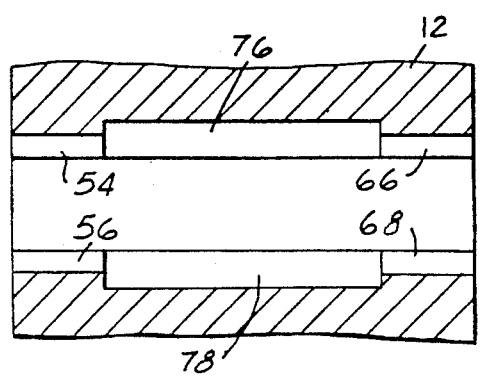
FIG. 6 is a fragmentary sectional view taken on the line 6—6 in FIG. 2.
Figure 5:
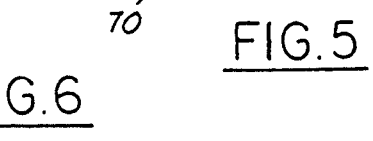
FIG. 5 is a fragmentary sectional view taken on the line 5—5 in FIG. 3.

Referring now more particularly to the drawings, there is shown a machine collet 10 in the form of a single piece cylindrical body 12 of a suitable spring steel or other strong, relatively stiff or rigid yet resilient and somewhat flexible material. A central blind bore 16 extends into the body 12 through the rear face 17. The body 12 is secured to a spindle 18 by bolts 20, with its rear face 17 rigidly clamped against the spindle face and with its central axis coinciding with the axis of rotation 21 of the spindle.

The body 12 is machined to provide three spaced apart, generally parallel slots 22, 24 and 26. The slots are relatively long in comparison to their width as seen in FIG. 1, with mutually generally parallel sides 28, 30, 32, 34, 36 and 38. Sides 32 and 34 of slot 24 are necked inwardly at the mid-portion where indicated at 40. The slots are parallel to the axis of rotation 21 and extend axially from the front face 42 of the body to the bottom of the blind bore 16. The center of the slot 24 coincides with the axis of rotation 21 of the spindle and of the body 12. The slots 22 and 26 are spaced equal distances from slot 24 on opposite sides thereof and form two integral flexural elements or flexures 44 and 46. The flexures 4 and 46 are substantially mirror images in size and shape. The flexures are capable of resilient flexing when placed under load.

The flexures 44 and 46 are formed to receive and grip the shank of a tool T on the axis of rotation 21. To grip the shank of the tool, the flexures have integral lands which will now be described.

Flexure 44 has circumferentially spaced arcuate lands 48 and 50 near the front face 42 of the body which are separated by a relief 52. Flexure 46 has circumferentially spaced arcuate lands 54 and 56 near the front face of the body which are separated by a relief 58. The lands 48, 50, 54 and 56 are equally spaced from the axis of rotation 21 and are ground to a diameter somewhat smaller than the smallest tool shank they are required to receive.

The flexure 44 has circumferentially spaced arcuate lands 60 and 62 near to the bottom face of bore 16 in the body which are separated by a relief 64. Flexure 46 has circumferentially spaced arcuate lands 66 and 68 near the bottom face of bore 16 in the body which are separated by a relief 70. The lands 60, 62, 66 and 68 are equally spaced from the axis of rotation 21 and are ground to the same diameter as the lands 48, 50, 54 and 56.

Land 48 is separated from land 60 by a relief 72. Land 50 is separated from land 62 by a relief 74. Land 54 is separated from land 66 by a relief 76. Land 56 is separated from land 68 by a relief 78.

Together, lands 48 and 50 in effect form a V block. Similarly, lands 54 and 56, lands 60 and 62, and lands 66 and 68 form V blocks. The V block formed by lards 48 and 50 is opposed to and cooperates with the V block formed by lands 54 and 56 at the front of the body to grip the shank of a tool. The V block formed by lands 60 and 62 is opposed to and cooperates with the V block formed by lands 66 and 68 at the rear of the body also to grip the shank of a tool.

The body is formed with aligned radially extending bolt holes 79 drilled on a line which extends through the axis of rotation 21 at right angles thereto. These holes extend through the slots 22 and 26 and into the flexures 44 and 46. Bolts 80 and 82 extend into these holes with bolt 80 threaded into the flexure 44 and bolt 82 threaded into flexure 46. The holes are counterbored to receive the heads of the bolts. When the bolts are tightened, the flexures 44 and 46 are flexed away from one another. The bolts may be provided with self-locking nuts 84 which limit the distance that the bolts may be backed out.

An adaptor 86 bolted to the spindle extends into the blind bore 16 in the body and has an elongated slot 88 to receive flats on the end of the tool shank to act as a driver for the tool. Four radial, equally-spaced set screws 90 are threaded in body 12 and bear on the outside diameter of adaptor 86 to provide means to centralize the body 12 on spindle 18.

In use, the bolts 80 and 82 are tightened to retract the flexures 44 and 46 and the shank of the tool is then loosely inserted into the mid-portion of the slot 24 with the flats on the ends of its shank extending into the slot 88 in the adaptor 86. The bolts 80 and 82 are then loosened to allow the flexures to return toward their natural free state condition enabling the V blocks provided by lands 48, 50, and lands 54, 56 at the front of the body 12 to securely grip the shank of the tool under a resilient clamping pressure. At the rear of the body 12, the V blocks provided by lands 60, 62 and lands 66, 68 also similarly grip the shank of the tool. The flexures grip the tool shank with a self-energizing action since they merely need to be released to resiliently clamp the tool shank. Since the flexures are machined to the same physical dimensions, any variation in the diameter of the tool shank will cause equal displacement of the V blocks and maintain centrality of the tool. The tool shank is firmly gripped at two axially spaced points by the two sets of V blocks. The tool may be easily released by tightening the bolts to retract the flexures and unclamp the tool shank.

What is claimed is:

1. A collet comprising a body of relatively stiff, resilient material, said body having an axis of rotation and a front face extending transversely of said axis of rotation, said body having a first slot opening through said front face in a positive such that said axis of rotation extends through said first slot, said body having a second slot opening through said front face and spaced from said first slot on one side thereof to provide a first flexure between said first and second slots, said body having a third slot opening through said front face and spaced from said first slot on the opposite side thereof to provide a second flexure between said first and third slots, said flexures having means for resiliently gripping the shank of a tool disposed in said first slot in concentric relation with said axis of rotation, and means for relatively retracting said flexures away from one another to release the shank of the tool.

2. The collet define din claim 1, wherein said gripping means comprises lands on said first flexure which together form a first V block and lands on said second flexure which together form a second V block, said first and second V blocks being opposed to one another and spaced equally from said axis of rotation and cooperable to grip the shank of a tool.

3. The collet defined in claim 2, wherein said gripping means comprises additional lands on said first flexure which together form a third V block and additional lands on said second flexure which together form a fourth V block, said third and fourth V blocks being opposed to one another and equally spaced from said axis of rotation and cooperable to grip the shank of a tool at a point along the length of the tool shank spaced from the point where said first and second V blocks cooperate to grip the tool shank.

4. The collet defined in claim 1, wherein said means for relatively retracting said flexures comprises a bolt extending through said body radially with respect to said axis of rotation and threadedly engaging said first flexure, and a second bolt extending through said body radially with respect to said axis of rotation and threadedly engaging said second flexure.

5. The collet defined in claim 3, wherein said third and fourth V blocks engage the tool shank with the same gripping force as said first and second V blocks.

6. The collet defined in claim 5, wherein said flexures and lands are disposed within the body of the collet.

7. The collet defined in claim 6, wherein said means for relatively retracting said flexures comprises a bolt extending through said body radially with respect to said axis of rotation and threadedly engaging said first flexure, and a second bolt extending through said body radially with respect to said axis of rotation and threadedly engaging said second flexure.

* * * * *

UNITED STATES PATENT AND TRADEMARK OFFICE
CERTIFICATE OF CORRECTION

PATENT NO. : 5,042,826

DATED : August 27, 1991

INVENTOR(S) : Donald W. Garnett

It is certified that error appears in the above-identified patent and that said Letters Patent is hereby corrected as shown below:

Column 3, line 47 "positve" should be --position--.

Signed and Sealed this

Third Day of November, 1992

*Attest:*

DOUGLAS B. COMER

*Attesting Officer*  Acting Commissioner of Patents and Trademarks